United States Patent [19]
Baker et al.

[11] 3,718,455
[45] Feb. 27, 1973

[54] METHOD OF COMBATTING WEEDS WITH α-NAPHTHOXY ACETAMIDES

[75] Inventors: Don R. Baker, Orinda; Harry Tilles, El Cerrito, both of Calif.; Chester L. Dewald, Celaya, Gto., Mexico

[73] Assignee: Stauffer Chemical Company, New York, N.Y.

[22] Filed: July 20, 1970

[21] Appl. No.: 56,656

Related U.S. Application Data

[60] Continuation-in-part of Ser. No. 794,836, Dec. 19, 1968, abandoned, which is a division of Ser. No. 637,624, May 11, 1967, abandoned, which is a continuation-in-part of Ser. No. 352,310, March 16, 1964, abandoned.

[52] U.S. Cl. ................................................. 71/118
[51] Int. Cl. ............................................... A01n 9/20
[58] Field of Search ................................... 71/118

[56] References Cited

UNITED STATES PATENTS 2,412,510  12/1946  Jones ................................... 71/118
2,577,969  12/1951  Jones ................................... 71/118

Primary Examiner—James O. Thomas, Jr.
Attorney—Daniel C. Block, Edwin H. Baker, Albert J. Adamcik and Harry A. Pacini

[57]  ABSTRACT

Substituted α-naphthoxy acetamides having the general formula

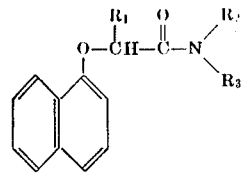

wherein $R_1$ selected from the group consisting of hydrogen and lower alkyl, $R_2$ is selected from the group consisting of hydrogen, lower alkyl, and lower alkenyl, and $R_3$ is selected from the group consisting of lower alkyl, and lower alkenyl; provided that when $R_1$ and $R_2$ are both hydrogen then $R_3$ is lower alkyl having from one to two carbon atoms, inclusive. The compounds are effective as herbicides in the control of grasses and broadleaf plants with both pre-emergence and post-emergence activity. Representative compounds are N,N-dimethyl α-naphthoxyacetamide, N,N-diethyl 2(α-naphthoxy)-propionamide, N-isopropyl 2(α-naphthoxy)-butyramide, and N-methyl α-naphthoxy-acetamide.

17 Claims, No Drawings

METHOD OF COMBATTING WEEDS WITH α-NAPHTHOXY ACETAMIDES

This application is a continuation-in-part of copending application Ser. No. 794,836 filed Dec. 19, 1968 now abandoned, which in turn is a divisional of then copending application Ser. No. 637,624, filed May 11, 1967, now abandoned, which application is a continuation-in-part of then copending application Ser. No. 352,310, filed Mar. 16, 1964, now abandoned.

This invention relates to certain new organic compounds which may be used as herbicides. More specifically, this invention relates to certain substituted α-anphthoxy acetamides and to the use of such compounds in herbicidal compositions.

The invention relates to compounds of the general formula:

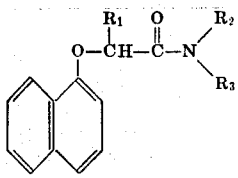

wherein $R_1$ is selected from the group consisting of hydrogen and lower alkyl, $R_2$ is selected from the group consisting of hydrogen, lower alkyl and lower alkenyl, and $R_3$ is selected from the group consisting of lower alkyl and lower alkenyl; provided that when $R_1$ and $R_2$ are both hydrogen, then $R_3$ is lower alkyl having from one to two carbon atoms, inclusive. By the term lower alkyl unless otherwise limited we mean saturated hydrocarbon radicals having from one to six carbon atoms such as methyl, ethyl, n-propyl, isopropyl, n-butyl, iso-butyl, sec.-butyl, n-pentyl, 1-methylbutyl, 1,2,2-trimethyl propyl, 1-ethylpropyl, and n-hexyl. By the term lower alkenyl we mean unsaturated hydrocarbon radicals having at least one double bond unsaturation and having between two and four carbon atoms, inclusive, such as ethylenyl, propenyl (allyl) and butenyl.

As a consequence of the presence of asymmetric carbon centers in certain of the compounds within the scope of this invention, it is recognized that the possibility exists for optical stereoisomerism. This phenomenon is understood and recognized by those skilled in the art. Forms of the same compound which are either *dextrorotatory* or *levorotatory* are possible in each instance wherein an asymmetric carbon atom is present.

It has been found that the compounds of the present invention are particularly effective as herbicides. They are effective in the control of grasses and broadleaf plants with both pre-emergence and post-emergence activity.

The compounds of the present invention may be made in accordance with the following examples.

EXAMPLE I

N,N-Dimethyl α-naphthoxy acetamide

Sodium hydride (1.47 g., 0.0615 moles) was placed in a 500 cc. three-neck flask flushed out with argon and then covered with toluene (100 ml.). The α-naphthol (0.58 g., 0.0658 moles) was then added to the mixture. The reaction mixture was refluxed for a few minutes. N,N-dimethyl chloroacetamide (8.0 g., 0.0658 moles) was then dissolved in toluene (20 ml.) and added to the refluxing mixture in 17 minutes. It was only slightly exothermic at the beginning of the addition. The mixture was refluxed for an additional 4 hours, cooled and water (50 ml.) was added. The organic layer was washed with 2 percent sodium hydroxide solution (3 × 50 ml.), water (2 × 50 ml.), dried over magnesium sulfate and evaporated on the steam bath to yield 13 g. of viscous dark amber liquid, $n_D^{28}$ 1.6084. On standing, it crystallized, m.p. 66°–72° C.

EXAMPLE 2

N,N-Diethyl 2(α-naphthoxy)-propionamide

α-Naphthol (144 g., 1.00 moles), N,N-diethyl α-bromopropionamide (208 g., 1.00 moles), and a 25 percent methanol solution of sodium methoxide (216 g., 1.00 moles) were mixed together and heated to reflux with stirring for 2½ hours. The reaction mixture was cooled to room temperature and diluted with water (1000 ml.). The product was extracted with chloroform (2 × 200 ml.) and the chloroform extract was dried over magnesium sulfate and evaporated in vacuo to yield 212 g. of a dark oil. On standing, crystals started to form and the remainder was crystallized from n-pentane and washed with n-pentane to yield 190 g. of light brown solid, m.p. 63°–64°C.

EXAMPLE 3

N-n-Propyl α-naphthoxyacetamide

Ethyl α-naphthoxy-acetate (6.7 g., 0.029 moles) and n-propylamine (10 ml.) and ethanol (50 ml.) were mixed together and heated to reflux for 3½ hours. The volatile materials were evaporated off in vacuo to yield an oil that started to crystallize. This was recrystallized from n-pentane to yield 6.8 g. of a white solid, m.p. 63°–65C.

EXAMPLE 4

N-Isopropyl 2(α-naphthoxy)-butyramide

α-Naphthol (7.2 g., 0.05 moles), dimethylformamide (100 ml.), sodium hydride (2.4 g., 0.10 moles), and N-isopropyl 2-bromobutyramide (10.3 g., 0.05 moles) were mixed together in the order listed. External cooling was used during the mixing of the reactants. The stirred mixture was heated to 75° to 80°C. for 1 hour. It was cooled to room temperature and water (200 ml.) was added. A solid formed and was filtered off, washed with water, dilute sulfuric acid and again with water. The solid was dried in vacuo and yielded 11 g. of a white solid, m.p. 117.5–119°.

EXAMPLE 5

Preparation of N-Methyl-N-butyl-2-(α-naphthoxy) propionamide

Methyl butyl amine, 6.1 g. (0.070 moles) and triethyl amine, 7.1 G. (0.070 moles) were dissolved in 100 ml. chloroform and the mixture was cooled to 5°C. in an ice-water bath. 2-(α-naphthoxy) propionyl chloride, 0.07 moles (16.6 g.), was dissolved in 25 ml. of chloroform and the solution was added dropwise to the amines at 5°–10°C. At the conclusion of the acid chloride addition, the cooling was removed and the reaction was warmed to room temperature. The reaction mixture was stirred 1 hour at room temperature.

The product solution was washed once with 150 ml. water and once with 150 ml. 5% sodium bicarbonate and dired over magnesium sulfate. Removal of the solvent in vacuum left an oil, 20.0 g. The oil was taken up in hot nonane. Upon cooling, a solid separated. There was obtained 16.3 g. (m.p. 53°–54°C.) of the title compound.

EXAMPLE 6

Preparation of N-Methyl-N-ethyl-2-( α -naphthoxy) propionamide

Methyl ethyl amine, 0.07 moles (4.2 g.), and triethyl amine, 0.07 moles (7.1 g.) were dissolved in 60 ml. benzene and the solution was cooled to 5°C. in an ice-water bath. 2-( α -naphthoxy) propionyl chloride, 0.07 moles (16.6 g.) was dissolved in 40 ml. benzene and this solution was added portionwise to the stirred solution of amines. The temperature of the reaction mixture went to 22°C. during the addition.

The cold bath was next removed and the mixture was heated at 80°C. for one-half hour. Upon cooling, the mixture was filtered free of amine hydrochloride. The filtrate was washed twice with 100 ml. portions of 10 percent hydrochloric acid and twice with 100 ml. portions of 5 percent sodium carbonate. After drying the solution over magnesium sulfate, the solvent was removed in vacuum leaving an oil, 10.8 g. The oil slowly crystallized to a solid, m.p. 58°–60°C., characterized as the title compound.

As noted supra optical stereoisomers are possible in the compounds which possess an asymmetric carbon atom. A pair of enantiomers, i.e. the stereoisomers of a given configuration, possess the same melting point, boiling point and the like. However, when subjected to polarized light the asymmetric material will exhibit optical rotation of the plane of polarization. Exemplary of this characteristic as applied to the compounds of this invention the dextrorotatory and levorotatory steromers of N,N-diethyl 2( α -naphthoxy)propionamide were prepared and tested as herbicidal agents. The letters $d$ and $l$ stand for dextro- and levo-, and refer to the sign of rotation. The signs (+) and (−) distinguish between the stereomers.

EXAMPLE 7

Preparation of $d$ and $l$ N,N-diethyl 2( α -naphthoxy) propionamide

The dl acid, 2( α -naphthoxy)propionic acid, was resolved through the cinchonine salt by the method of E. Fourneau et Balaceano, Bull. Soc. Chim. France, 37, 1602(1925). This gave d-acid 90 percent optical purity, $[\alpha]_D^{20} = +42.1°$ (absolute ethanol) and l-acid of 85 percent optical purity $[\alpha]_D^{20} = −39.6°$ (absolute ethanol).

The d-acid was converted to the acid chloride by slurring 0.015 moles (3.2 g.) of the d-acid in 10 ml. benzene in which 0.05 ml. dimethyl formamide had been dissolved. The mixture was heated to 45°C. and phosgene was condensed through a dry-ice condenser into a dropping funnel. The liquid phosgene was added dropwise until 0.030 (3.0 g.) had been added. During the addition, the temperature of the reaction mixture was maintained at 45°–50°C.

When hydrogen chloride evolution ceased, the reaction mixture was cooled and the solution was decanted from the formimium complex. The solution was put on a rotary evaporator to remove HCl, $COCl_2$ and benzene. This procedure left the d-acid chloride, 3.4 g., which was converted to the amide.

Diethyl amine, 0.02 moles (1.5 g.) and triethyl amine, 0.021 moles (2.2 g.) were dissolved in 10 ml. benzene and the solution was cooled in an ice-water bath. The d-acid chloride was dissolved in 10 ml. benzene and this solution was slowly added to the amine mixture. The temperature rose to 50°C.

After allowing the reaction mixture to stand at room temperature for approximately 16 hours, the triethyl amine hydrochloride was filtered off and the filtrated was washed twice with 50 ml. portions of 10% HCl and twice with 50 ml. portions of 5 percent $Na_2CO_3$ and then dried over $MgSO_4$.

Removal of the solvent left an oil which crystallized to a solid. There was obtained 3.4 g. (61.6% of theory) of solid, predominantly the dextrorotatory form of N,N-diethyl 2( α -naphthoxy) propionamide, 3.4 g. (61.6 percent of theory) with a m.p. of 87°–92.5°C. The amide had a specific rotation $[\alpha]_D^{20} = +109.4°$ (absolute ethanol)

The procedure described above was repeated with the l acid, 0.021 moles (4.5 g.) phosgene, 0.05 moles (5.0 g.) to give 4.9 g. of the l-acid chloride (99.8 percent of theory). This acid chloride was converted to the diethyl amide in the manner described above to give 4.6 g. (80.4 percent of theory) of an oil which crystallized to a solid, m.p. 89°–92.5°C. The amide was predominantly the the levorotatory form of N,N-diethyl 2( α -naphthoxy)propionamide with the specific rotation, $[\alpha]_D^{20} = −116.6°$ (absolute ethanol).

The following is a table of the compounds prepared according to the aforedescribed procedures. Compound numbers have been assigned to each compound and are used throughout the balance of the application.

TABLE I

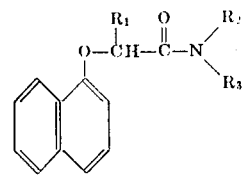

| Compound Number | $R_1$ | $R_2$ | $R_3$ |
|---|---|---|---|
| 1* | H | $CH_3$ | $CH_3$ |
| 2 | H | $C_2H_5$ | $C_2H_5$ |
| 3 | H | $n-C_3H_7$ | $n-C_3H_7$ |
| 4* | $CH_3$ | $C_2H_5$ | $C_2H_5$ |
| 5 | $CH_3$ | $CH_3$ | $CH_3$ |
| 6 | $CH_3$ | $iso-C_3H_7$ | $iso-C_3H_7$ |
| 7 | $CH_3$ | $-CH_2CH=CH_2$ | $-CH_2CH=CH_2$ |
| 8* | H | H | $n-C_3H_7$ |
| 9* | $C_2H_5$ | H | $iso-C_3H_7$ |
| 10 | $CH_3$ | $n-C_3H_7$ | $n-C_3H_7$ |
| 11 | H | $-CH_2CH=CH_2$ | $-CH_2CH=CH_2$ |
| 12 | H | $iso-C_3H_7$ | $iso-C_3H_7$ |
| 13 | H | $n-C_4H_9$ | $n-C_4H_9$ |
| 14 | H | $iso-C_4H_9$ | $iso-C_4H_9$ |
| 15 | $C_2H_5$ | $n-C_3H_7$ | $n-C_3H_7$ |
| 16 | $C_2H_5$ | $-CH_2CH=CH_2$ | $-CH_2CH=CH_2$ |
| 17 | H | H | $C_2H_5$ |
| 18 | H | H | $CH_3$ |
| 19 | $C_2H_5$ | H | $n-C_4H_9$ |
| 20 | $CH_3$ | H | $n-C_4H_9$ |
| 21 | $C_2H_5$ | H | $n-C_4H_9$ |
| 22 | $C_2H_5$ | H | $i-C_4H_9$ |
| 23 | $CH_3$ | $n-C_4H_9$ | $n-C_3H_7$ |
| 24 | $CH_3$ | $(CH_3)_3CH_3$ | $C_2H_5$ |
| 25 | $CH_3$ | $n-C_4H_9$ | $C_2H_5$ |

| | | | |
|---|---|---|---|
| 26* | CH₃ | n-C₄H₉ | CH₃ |
| 27 | CH₃ | n-C₃H₇ | CH₃ |
| 28 | CH₃ | —CHCH₃<br>\|<br>CH₃ | CH₃ |
| 29 | CH₃ | —CH₂CH(CH₃)₂ | CH₃ |
| 30 | CH₃ | —C₃H₇ | C₂H₅ |
| 31 | CH₃ | CH(CH₃)CH₂CH₃ | CH₃ |
| 32 | H | —CH₂CH=CH₂ | C₃H₇ |
| 33 | H | —CH₃ | —(CH₂)₅CH₃ |
| 34 | C₂H₅ | CH₃ | CH₃ |
| 35 | C₂H₅ | C₂H₅ | C₂H₅ |
| 36* | CH₃ | CH₃ | C₂H₅ |
| 37 | C₂H₅ | CH₃ | C₂H₅ |
| 38 | H | CH₃ | s-C₄H₉ |
| 39 | H | CH₃ | i-C₃H₇ |
| 40 | H | C₂H₅ | i-C₃H₇ |
| 41 | H | C₃H₇ | i-C₃H₇ |
| 42 | H | C₂H₅ | s-C₄H₉ |
| 43 | H | CH₃ | C₂H₅ |
| 44 | H | C₂H₅ | n-C₄H₉ |
| 45 | H | C₂H₅ | i-C₄H₉ |
| 46 | H | CH₃ | n-C₅H₁₁ |
| 47 | H | CH₃ | n-C₃H₇ |
| 48 | H | C₂H₅ | n-C₃* 7 |
| 49 | H | CH₃ | i-C₄H₉ |
| 50 | CH₃ | H | CH(CH₃)CH₂CH₂CH₃ |
| 51 | CH₃ | H | CH(CH₃)C(CH₃)₃ |
| 52 | CH₃ | H | CH(C₂H₅)₂ |
| 53 | CH₃ | H | C(CH₃)₃ |
| 54(dextro-)* | CH₃ | C₂H₅ | C₂H₅ |
| 55(levo-)* | CH₃ | C₂H₅ | C₂H₅ |

\* No. 1 prepared in Example 1
\* No. 4 prepared in Example 2
\* No. 8 prepared in Example 3
\* No. 9 prepared in Example 4
\* No. 26 prepared in Example 5
\* No. 36 prepared in Example 6
Nos. 54 and 55 prepared in Example 7

As previously mentioned, the herein described novel compositions produced in the above-described manner are phytotoxic compounds which are useful and valuable in controlling various plant species. The compounds of this invention were tested as herbicides in the following manner.

Pre-emergence Herbicide Test

The seeds of crabgrass, annual bluegrass, watergrass and foxtail were planted in individual rows one-half inch deep in Santa Cruz sandy loam soil contained in compressed paper flats 8¼ × 6½ inches which are 2¾ inches deep. Enough seeds were planted to give about thirty to fifty plants each of the weed species in each flat. The flats were watered after planting. The following day each flat was sprayed at the rate of 20 pounds of the candidate compound under test in 80 gallons of solution per acre. An atomizer was used to spray the solution on the soil surface. Two weeks later the degree of weed control is determined by comparing the amount of germination and growth of each weed in the treated flats with weeds in several untreated control flats. The results of this test are reported in Table II.

TABLE II

| Compound Number | Crab Grass | Annual Blue-grass | Water-grass | Foxtail |
|---|---|---|---|---|
| 1 | +++ | | +++ | +++ |
| 2 | +++ | | +++ | +++ |
| 3 | +++ | | +++ | +++ |
| 4 | +++ | +++ | +++ | |
| 5 | +++ | +++ | +++ | |
| 6 | +++ | +++ | +++ | |
| 7 | +++ | +++ | +++ | |
| 8 | +++ | +++ | +++ | |
| 9 | ++ | + | | |
| 10 | +++ | | +++ | +++ |
| 11 | +++ | +++ | +++ | |
| 12 | +++ | | +++ | +++ |
| 13 | +++ | | +++ | +++ |
| 14 | +++ | | +++ | + |
| 15 | +++ | | +++ | +++ |
| 16 | +++ | | +++ | +++ |
| 17 | +++ | | +++ | |
| 18 | +++ | | +++ | |
| 19 | +++ | +++ | +++ | |
| 20 | +++ | +++ | +++ | |
| 21 | +++ | | +++ | +++ |
| 22 | +++ | | + | |

+++ × Severe injury or death
++ × Moderate injury
+ × Slight injury

It has also been found that compounds within the scope of the present invention have effectiveness in the pre-emergence control of such additional weed species as Red oats, Pigweed, Indian mustard and Curled dock. Post-emergence activity has also been found on the following species: Crabgrass, Watergrass, Red oats, Indian mustard, Curly dock and Pinto bean. Some of the compounds are quite selective in their action and can be used to eradicate or control grasses, while another type of plant is relatively unaffected.

The following Table III summarizes the data obtained from compounds of this invention when tested as pre- and post- emergence herbicides according to the following test procedure.

Pre-emergence herbicide test

On the day preceding treatment, seeds of seven different weed species are planted in individual rows using one species per row across the width of the flat. The seeds used are hairy crabgrass (*Digitaria sanguinatis* (L.) Scop.), yellow foxtail (*Setaria glauca* (L.) Beauv.), watergrass (*Echinochloa crusgalli* (L.) Beauv.), wild oats (*Avena fatua* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent such as acetone containing 1 percent Tween 20 (polyoxy-ethylene sorbitan monolaurate) and diluting with a small amount of water. The following day each flat is sprayed at the rate of 20 pounds of the candidate compound per 80 gallons of solution per acre. An atomizer is used to spray the solution on the soil surface. The flats are placed in a greenhouse at 80°F. and watered regularly. Two weeks later the degree of weed control is determined by comparing the amount of germination and growth of each weed in the treated flats with weeds in several untreated control flats. The rating system is as follows:

— = no significant injury (0–15 percent control)
+ = slight injury (25–35 percent control)
++ = moderate injury (55–65 percent control)
+++ = severe injury or death (85–100 percent control)

An activity index is used to represent the total activity on all seven weed species. It is the sum of the number of plus marks, so that an activity index of 21 represents complete control of all seven weeds.

Post-emergence herbicide test

Seeds of five weed species including hairy crabgrass, watergrass, wild oats, Indian mustard, and curly dock and one crop pinto beans (*Phaseolus vulgaris*), are planted in flats as described above for pre-emergence screening. The flats are placed in the greenhouse at 72°–85°F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1 percent Tween 20 (polyoxy-ethylene sorbitan monolaurate) and then adding 5 ml. of water. The solution is sprayed on the foliage using an atomizer. The spray concentration is 0.5 percent and the rate would be approximately 20 lbs./acre if all of the spray were retained on the plant and the soil, but some spray is lost so it is estimated that the application is approximately 12.5 lbs./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where (−), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test.

TABLE III

HERBICIDAL ACTIVITY**-SCREENING RESULTS

| Compound Number | Pre-emergence | Post-emergence |
| --- | --- | --- |
| 23 | 9 | 8 |
| 24 | 11 | 17 |
| 25 | 12 | 16 |
| 26 | 9 | 15 |
| 27 | 11 | 16 |
| 28 | 9 | 12 |
| 29 | 9 | 6 |
| 30 | 12 | 16 |
| 31 | 10 | 12 |
| 32 | 10 | 14 |
| 33 | 9 | 14 |
| 34 | 13 | 18 |
| 35 | 13 | 17 |
| 36 | 15 | 18 |
| 37 | 12 | 18 |
| 38 | 11 | 10 |
| 39 | 12 | 11 |
| 40 | 12 | 11 |
| 41 | 11 | 13 |
| 42 | 15 | 13 |
| 43 | 19 | 18 |
| 44 | 15 | 18 |
| 45 | 18 | 16 |
| 46 | 14 | 15 |
| 47 | 18 | 16 |
| 48 | 13 | 17 |
| 49 | 14 | 16 |
| 50 | 9 | 2 |
| 51 | 8 | 1 |
| 52 | 0 | 1 |
| 53 | 14 | 6 |
| 54 | 16 | 18 |
| 55 | 18 | 17 |

The compounds of the present invention may be used as pre-emergence or post-emergence herbicides and may be applied in a variety of ways at various concentrations. They may be combined with suitable carriers and applied as dusts, sprays or drenches. The amount applied will depend on the nature of the weeds or plants to be controlled and the rate of application may vary from 1 to 50 pounds per acre. One particularly advantageous way of applying the compounds is as a narrow band along a row crop straddling the row.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. The method of combating weeds comprising applying thereto a phytotoxic amount of a compound corresponding to the formula

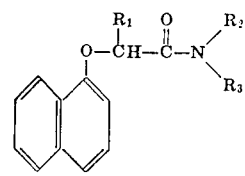

wherein $R_1$ is selected from the group consisting of hydrogen and lower alkyl, $R_2$ is selected from the group consisting of hydrogen, lower alkyl, and lower alkenyl, and $R_3$ is selected from the group consisting of lower alkyl, and lower alkenyl; provided that when $R_1$ and $R_2$ are both hydrogen, then $R_3$ is lower alkyl having from one to two carbon atoms, inclusive.

2. The method of combating weeds according to claim 1 in which $R_1$ is hydrogen, $R_2$ is methyl and $R_3$ is methyl.

3. The method of combating weeds according to claim 1 in which $R_1$ is ethyl, $R_2$ is hydrogen and $R_3$ is isopropyl.

4. The method of combating weeds according to claim 1 in which $R_1$ is methyl, $R_2$ is allyl and $R_3$ is allyl.

5. The method of combating weeds according to claim 1 in which $R_1$ is hydrogen, $R_2$ is hydrogen and $R_3$ is methyl.

6. The method of combating weeds according to claim 1 in which $R_1$ is ethyl, $R_2$ is hydrogen and $R_3$ is n-butyl.

7. The method of controlling weeds comprising applying thereto a phytotoxic amount of a compound corresponding to the formula

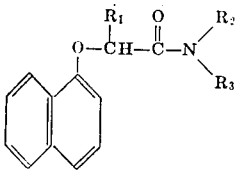

wherein $R_1$ is lower alkyl, $R_2$ is lower alkyl and $R_3$ is lower alkyl.

8. The method of combating weeds according to claim 7 in which $R_1$ is methyl, $R_2$ is methyl and $R_3$ is methyl.

9. The method of combating weeds according to claim 7 in which $R_1$ is methyl, $R_2$ is isopropyl and $R_3$ is isopropyl.

10. The method of combating weeds according to claim 7 in which $R_1$ is methyl, $R_2$ is ethyl and $R_3$ is ethyl.

11. The method of combating weeds according to claim 7 in which $R_1$ is ethyl, $R_2$ is n-propyl and $R_3$ is n-propyl.

12. The method of combating weeds according to claim 7 in which $R_1$ is methyl, $R_2$ is n-butyl and $R_3$ is ethyl.

13. The method of combating weeds according to claim 7 in which $R_1$ is methyl, $R_2$ is methyl and $R_3$ is ethyl.

14. The method of combating weeds according to claim 7 in which $R_1$ is ethyl, $R_2$ is methyl and $R_3$ is ethyl.

15. The method of combating weeds according to claim 7 in which $R_1$ is ethyl, $R_2$ is ethyl and $R_3$ is ethyl.

16. The method of combating weeds according to claim 7 in which said compound is the dextrorotatory stereoisomer, wherein $R_1$ is methyl, $R_2$ is ethyl, and $R_3$ is ethyl.

17. The method of combating weeds according to claim 7 in which said compound is the levorotatory wherein $R_1$ is methyl, $R_2$ is ethyl, and $R_3$ is ethyl. ethyl,

* * * * *